May 21, 1929. R. LEON 1,714,383
TRUCK
Filed Dec. 3, 1927 2 Sheets-Sheet 2

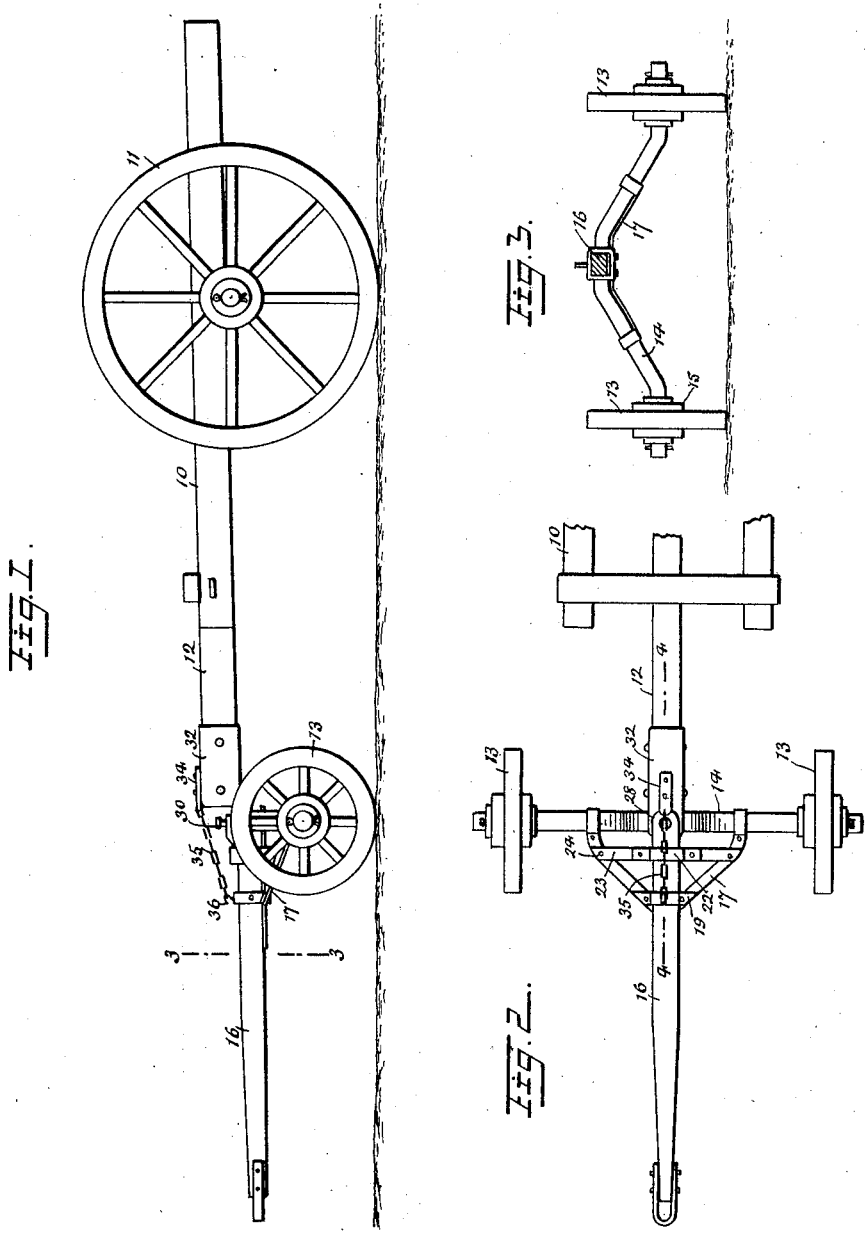

WITNESSES
H. T. Walker
F. J. Foster

INVENTOR
Ricardo Leon
BY
ATTORNEY

Patented May 21, 1929.

1,714,383

UNITED STATES PATENT OFFICE.

RICARDO LEON, OF MORON, CUBA, ASSIGNOR TO COMPANIA AGRICOLA MIRAFLORES, S. A., OF MORON, CUBA, A CORPORATION OF CUBA.

TRUCK.

Application filed December 3, 1927, Serial No. 237,482, and in Cuba June 2, 1927.

The truck of the present invention is capable of a wide range of utility, but finds one of its preferred embodiments as a means for supporting the forward end of the conventional Cuban cane cart, and serving as a supplemental traction means therefor.

An object of the invention is to provide a truck of this character, together with unique means for coupling the truck to a cart, or other trailer with which it is to be associated.

Another object of the invention is to provide a truck of extremely practical construction, which will be rugged and durable in use, and well suited to the requirements of economical manufacture and convenient manipulation.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a side elevational view showing a truck coupled to a cane cart.

Fig. 2 is a fragmentary top plan view of Fig. 1.

Fig. 3 is a transverse sectional view on the line 3—3 of Fig. 1 with parts of the mechanism omitted for the sake of clearness.

Figure 4:
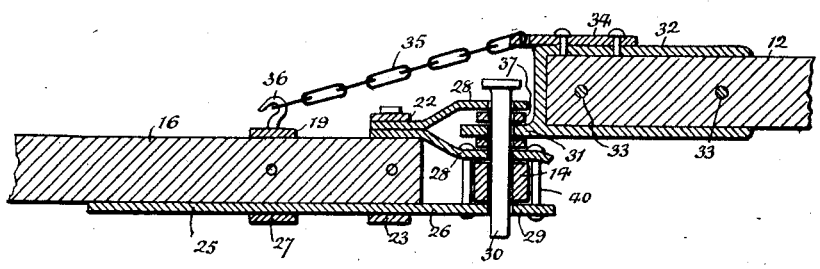
Fig. 4 is an enlarged longitudinal sectional view on the line 4—4 of Fig. 2.
Figure 5:
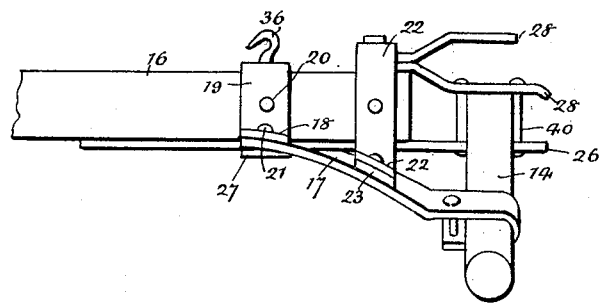
Fig. 5 is an enlarged side elevational view of the rear end of the truck with the traction wheels removed.
Figure 6:
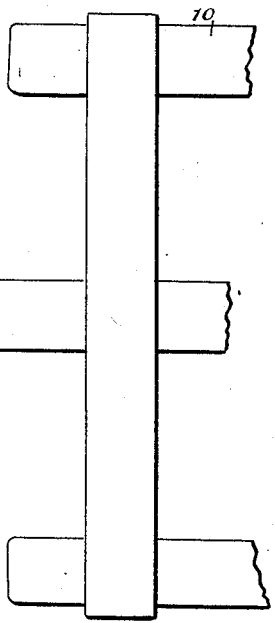
Fig. 6 is a top plan view of the forward end of the cart.
Figure 7:
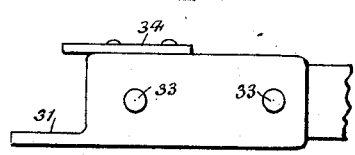
Fig. 7 is a side elevational view of the coupling mechanism at the forward end of the cart.

In the drawings I have used the reference numeral 10 to designate generally the skeleton body of a conventional cane car provided with the usual single pair of traction wheels 11 and forwardly projecting draw bar 12. The truck of the present invention is peculiarly adapted for connection to the draw bar of a cart of this character in order to serve as a supplemental traction means for the car.

The truck also includes a single pair of traction wheels 13 preferably considerably smaller than the cart wheels, and connected by an axle 14 which inclines upwardly from the wheel hubs 15 providing substantially an inverted V-shaped structure designed to clear stumps and other obstructions in the ground as the truck is rolled along.

Where the truck is to be drawn by oxen as is customary, the axle mounts a pole or tongue 16. If the truck is to be tractor-drawn, it may be connected to the tractor by any suitable hitch (not shown).

The support of the pole 16 on the truck axle is effected by the use of inwardly and upwardly curving brace bars 17 secured at their rear ends to the axle, and at their forward ends to the horizontal terminal portions 18 of a generally U-shaped strap 19 straddling and embracing the tongue 16 and bolted thereto as at 20. The ends of the braces 17 may be bolted, riveted or otherwise secured at 21 to the strap terminals 18. The braces are additionally secured by the use of a generally similar strap 22 disposed rearwardly of the strap 19, and having its feet connected to a cross bar 23, the ends of which are riveted at 24 to the braces 17.

A longitudinally extending plate 25 is arranged under the rear end of the pole 16 and has a projecting end 26. This plate may be secured directly to the pole, but is preferably held in position by the cross bar 23 and by a similar cross bar 27 connected to the forward ends of the braces 17. Secured between the strap 22 and the top of the pole 16 are rearwardly extending coupling plates 28 diverging to provide a fork. Both arms of this fork as well as the projecting end 26 of the plate 25 are provided with aligned openings 29 for the reception of a king bolt 30. Plate 26 is disposed under the axle 14 and the fork 28, 28 above it; the king bolt passing through the fork axle and plate as well as through the apertured forwardly projecting end 31 of a squared sleeve 32 fitted over the front of the draw bar 12 and bolted thereto as at 33. To hold the pole 16 in normally elevated position, a plate 34 is secured upon the top of the sleeve 32 and serves as an anchorage for a short length of chain 35, the free end of which is adapted for connection with a hook 36 on the strap 19.

Any suitable number of gaskets 37 may be used around the king bolt between the members 28 and 31. The coupling of the pole 16 to the axle is rendered permanent by using bolts 40 to connect the lower plate 28 with the extension 26.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claim.

I claim:

A two wheeled truck adapted to support the forward end of and consitute supplemental traction means for a two wheeled cart or the like, the truck including a wheel axle having an elevated intermediate portion sloping downwardly toward its ends, a tongue connected at its rear end to the center of the axle, inclined braces connected to the axle and tongue, and a strap embracing the tongue and to which the forward ends of the braces are connected, a second strap embracing the tongue and a cross bar carried by the strap and engaging the braces at their intermediate portions.

RICARDO LEON.